United States Patent [19]
Ruben

[11] 3,798,070
[45] Mar. 19, 1974

[54] LEAD-ACID STORAGE BATTERY WITH TITANYL SULFATE BUFFERED ELECTROLYTE

[76] Inventor: Samuel Ruben, 52 Seacord Rd., New Rochelle, N.Y. 10801

[22] Filed: May 12, 1972

[21] Appl. No.: 252,724

Related U.S. Application Data

[63] Continuation-in-part of Ser. Nos. 886,415, Dec. 18, 1969, abandoned, and Ser. No. 166,717, May 12, 1972, abandoned.

[52] U.S. Cl. .................................. 136/26, 136/154
[51] Int. Cl. ......................................... H01m 39/00
[58] Field of Search ............................... 136/26–27, 136/154, 157–158, 138

[56] References Cited
UNITED STATES PATENTS

| 2,649,766 | 8/1953 | Johnson | 136/154 |
| 2,631,115 | 3/1953 | Fox | 136/138 |
| 1,607,920 | 11/1926 | Sato | 136/26 |
| 3,305,396 | 2/1967 | Rauter | 136/158 X |
| 263,756 | 9/1882 | Brush | 136/45 |
| 1,748,485 | 2/1930 | Kugel | 136/154 |
| 2,079,208 | 5/1937 | Hibbert et al | 136/26 |

*Primary Examiner*—Anthony Skapars

[57] ABSTRACT

A titanium grid is used to support the positive electrode of lead peroxide while the negative porous lead electrode is supported on either a copper or titanium grid in a lead-lead-acid storage battery. A small quantity of titanyl sulfate is added to the aqueous sulfuric acid electrolyte to inhibit dissolubility of the titanium therein. In one battery embodiment the electrolyte is immobilized by gelling and confined between the electrodes while the assembly is surrounded with an insulating wrapping and sealed hermetically in a quantity of cured epoxy resin.

19 Claims, 4 Drawing Figures

PATENTED MAR 19 1974 3,798,070

INVENTOR.
SAMUEL RUBEN
BY

ATTORNEY

LEAD-ACID STORAGE BATTERY WITH TITANYL SULFATE BUFFERED ELECTROLYTE

DISCLOSURE

This application is a continuation-in-part of my copending application Ser. No. 886,415, filed Dec. 18, 1969, entitled "Electrolyte for Lead-Acid Storage Batteries," now abandoned and Ser. No. 166,717, filed July 28, 1971, entitled "Hermetically Sealed Lead Acid Storage Battery Having Immobilized Electrolyte", now abandoned; said application Ser. No. 886,415 being a continuation-in-part of the following applications: Serial No. 758,274, filed Sept. 9, 1968, entitled "Storage Battery Having a Positive Electrode Comprising a Supporting Base of Titanium Nitride Having a Surface Film of Non-Polarizing Material," now U.S. Pat. No. 3,486,940; Ser. No. 800,078, filed Feb. 18, 1969, now abandoned; Ser. No. 868,133, filed Oct. 21, 1969, entitled "Lead Peroxide-Sulfuric Acid Cell," now Pat. No. 3,576,674; and Ser. No. 884,051, filed Dec. 10, 1969, entitled "Spacer for Lead Sulfuric Acid Storage Batteries", now abandoned; and said application Ser. No. 166,717 being a continuation-in-part of said application Ser. No. 886,415 and of applications Ser. No. 51,457, filed July 1, 1970, entitled "Lead Oxide Sulfuric Acid Battery," now Pat. No. 3,615,831; and Ser. No. 82,701, filed Oct. 21, 1970, entitled "Hermetically Sealed Lead Acid Storage Battery", now abandoned.

The present invention relates to an electric storage battery and, more particularly, to a lead-lead-acid battery.

The lead-lead-acid (sometimes shortened to lead-acid) storage battery represents one of the oldest known forms of secondary cell. Because of its many well known advantages it has been improved over the years but not supplanted.

Disadvantages of the lead-acid battery are its undue weight due to the lead plates and its size where rugged construction is required. It has been known that such disadvantages would be avoided or at least minimized by employing titanium, a strong light weight metal, as a core or grid support for lead paste electrodes. However, titanium is attacked and dissolved by sulfuric acid, the usual electrolyte in such batteries.

It is, therefore, an object of the present invention to provide a lead-acid storage battery with one or both of its electrodes supported on titanium core structures. More specifically, an object of the present invention is to provide a lead-acid storage battery having at least the positive electrode supported on a titanium core which is free from attack by the electrolyte.

In accordance with one aspect of the present invention there is provided an electric storage battery comprising a positive electrode of lead peroxide supported on a titanium grid. The negative electrode is of porous lead supported on a conductive metallic grid. The electrolyte comprises a mixture of a major proportion by weight of aqueous sulfuric acid solution and a minor proportion by weight of titanyl sulfate with the latter being dissolved in said acid solution in sufficient quantity to inhibit dissolubility in said electrolyte of the titanium from said titanium grid. The foregoing is based upon the fundamental discovery that the addition of a small quantity of titanyl sulfate, e.g., having the formula $TiOSO_4 \cdot H_2SO_4 \cdot 8H_2O$, to an aqueous sulfuric acid solution produces an electrolyte which will not or at most only slightly dissolve titanium metal.

Further improvement of the storage battery can be obtained in accordance with another aspect of the present invention wherein the battery electrolyte is provided in the form of a gel so as to be virtually immobilized. Ordinarily, the titanyl sulfate buffered electrolyte reacts with the porous lead of the negative electrode causing colloidal lead to enter the electrolyte with the attendant probability of forming bridging parts and deterioration of the battery. When the electrolyte is immobilized by gelling, the reaction is restricted to the surface of the negative electrode, the colloidal lead being unable to migrate through the gelled material.

The invention will be better understood after reading the following detailed description thereof with reference to the appended drawings in which.

Figure 1:
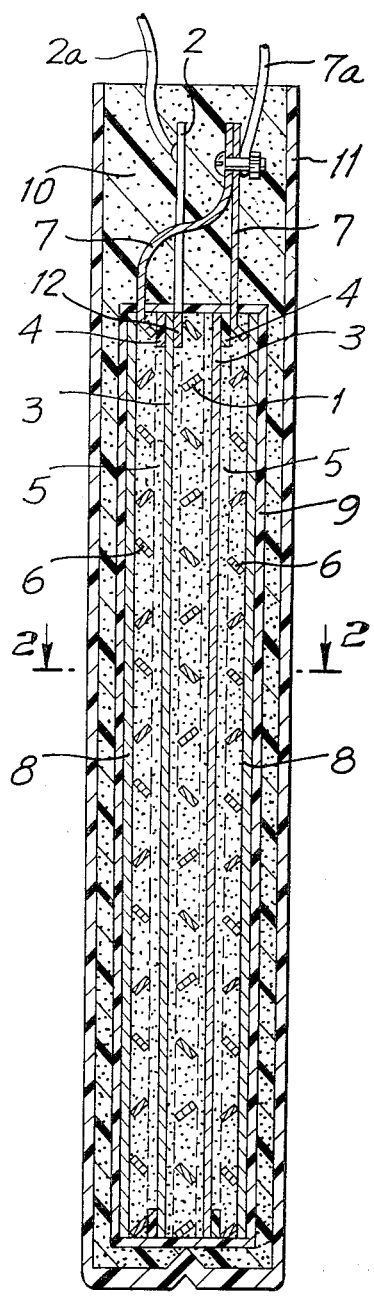
FIG. 1 is a vertical sectional view through a battery embodying the invention.

Before describing the details of construction of a typical battery embodying the present invention, the novel electrolyte employed therein will be described with reference to several examples.

EXAMPLE 1

A quantity of electrolyte was produced by heating a 20 percent by volume solution of sulfuric acid having a specific gravity of 1.220 to which 2 percent by weight of titanyl sulfate having the formula $TiOSO_4 \cdot H_2SO_4 \cdot 8H_2O$ had been added, the mixture being continuously stirred and brought to a temperature of 105° C. at which point a slight opalescent color is evident and eliminated by passing the solution through a Buchner filter. The resultant buffered acid solution had a specific gravity of the order of 1.246.

EXAMPLE 2

To 300 cc. of distilled water was slowly added 69.23 cc. of reagent grade sulfuric acid having a specific gravity of 1.83 to yield an aqueous sulfuric acid solution having a specific gravity of 1.200.

To 300 cc. of the sulfuric acid solution thus prepared there was added 10 grams of titanyl sulfate having the formula $TiOSO_4 \cdot H_2SO_4 \cdot 8H_2O$. The mixture was accurately weighed. Then it was slowly heated while stirring until it reached a temperature of 85° C. at which point there was observed a noticeable change from a cloudy to an opalescent appearance.

The solution was then allowed to cool at which time the weight was again determined and the solution was adjusted by the addition of distilled water for evaporation loss. Next, the solution was allowed to stand for 48 hours to clarify. Some precipitation was observed. The clear buffered acid solution was then decanted and found to have a specific gravity of 1.214.

Next, a test sample of pure titanium of known weight measuring 1⅛ inches square and having a thickness of 0.0095 inch was immersed in 30 cc. of the buffered acid solution produced above and placed in an oven at 60° C. for 48 hours. The weight of the titanium sample was determined at the end of the 48 hour period. This measurement revealed a weight gain of 0.25 percent, the gain being attributed to a slight oxidation with the metal having a bronze colored appearance at the completion of the test.

EXAMPLE 3

A pure titanium test sample identical in size to that employed in Example 2 was immersed in 30 cc. of unbuffered aqueous sulfuric acid solution having a specific gravity of 1.200 produced in the manner described in Example 2 prior to the addition of the titanyl sulfate. With the titanium sample immersed therein the acid was placed in an oven for 48 hours at 60° C. The weight of the titanium sample was measured both before and after immersion in the acid solution revealing a weight loss of 92.5 percent.

EXAMPLE 4

A quantity of aqueous sulfuric acid solution having a specific gravity of 1.300 was prepared by adding 117.40 cc. of reagent grade sulfuric acid having a specific gravity of 1.83 to 300 cc. of distilled water. A test sample of pure titanium of known weight was immersed in said acid solution and measured for weight loss following the same procedure as set forth in Example 3. The weight loss was 82.2 percent.

EXAMPLE 5

To 300 cc. of the 1.300 specific gravity acid produced in Example 4 there was added 10 grams of titanyl sulfate in the same manner as described in Example 2 with the solution being heated to 105° C. until a change in appearance occurred. The resultant solution was then cooled and reconstituted for evaporation in the same manner as set forth in Example 2. It was then permitted to settle and decanted to provide a buffered acid solution with a specific gravity of 1.310 which was used in a test on a sample of pure titanium of the same dimension as set forth in Example 2 with a resultant weight loss of 0.22 percent.

EXAMPLE 6

A series of buffered acid solutions were prepared starting with a base aqueous sulfuric acid solution having a given specific gravity. Various quantities of titanyl sulfate was added to 300 cc. of the selected base solution. The mixtures were then heated to particular temperatures noting both changes in appearance and the temperature. Restoration of evaporated water, settling and decanting was performed as in Example 2, the specific gravities were determined, and the resultant solutions were tested on pure titanium samples, again as described in Example 2. The results of these tests are set forth in Table I.

TABLE I

| Specific gravity of base acid | Grams titanyl sulfate added | Becomes pearlescent at ° C. | Maximum temperature ° C. | Specific gravity of resultant solution | Weight loss of sample % |
|---|---|---|---|---|---|
| 1.200 | 1.0 | 75 | 100 | 1.20276 | 0.48 |
| 1.200 | 3.0 | 85 | 95 | 1.20476 | 0.20 |
| 1.200 | 5.0 | 85 | 100 | 1.20985 | 0.08 |
| 1.200 | 7.0 | 85 | 105 | 1.21004 | 0.05 |
| 1.300 | 1.0 | 95 | 105 | 1.30300 | 0.73 |
| 1.300 | 3.0 | 95 | 105 | 1.30101 | 0.45 |
| 1.300 | 5.0 | 95 | 105 | 1.30300 | 0.35 |
| 1.300 | 7.0 | 100 | 105 | 1.30204 | 0.27 |
| 1.300 | 10.0 | 105 | 135 | 1.30583 | 0.22 |
| 1.300 | 50.0 | * | 105 | 1.31559 | 0.21 |

* Solution remains milk-white, pearlescence not observable.

EXAMPLE 7

A quantity of base acid solution having a specific gravity of 1.050 was prepared by adding 14.72 cc. of reagent grade sulfuric acid having a specific gravity of 1.83 to 300 cc. of distilled water. To 300 cc. of the base acid was added 10 grams of titanyl sulfate and the mixture was heated to 70° C. This was followed by cooling, replacing lost water, settling, decanting and testing on a test sample of pure titanium all as described in Example 2. The specific gravity of the decanted solution was 1.066 and the immersed test sample evidenced a 0.14 percent gain in weight attributable to oxide accretion. When a similar test sample was immersed in a quantity of the 1.050 sp. gr. base acid following the same procedure as in Example 3, the sample evidenced a 14.11 percent loss in weight.

EXAMPLE 8

The test of Example 7 was repeated with a base acid having a specific gravity of 1.100 produced by mixing 30.00 cc. of reagent with 300 cc. of distilled water. The mixture being heated to 75° C. after adding 10 grams of titanyl sulfate, all the remaining steps being the same. The decanted specific gravity of the buffered solution was 1.116 and the test sample evidenced a 0.06 percent gain in weight. When the sample was immersed in the unbuffered base acid the weight loss was 32.35 percent.

EXAMPLE 9

For this test, 5 grams of the titanyl sulfate was added to 150 cc. of the buffered solution having a specific gravity of 1.310 which had been produced in Example 5. The mixture was reheated to 105° C., allowed to cool, reconstituted for evaporated water, permitted to settle, and decanted, all in the same manner as set forth in Example 2. The new solution now had a specific gravity of 1.3156.

EXAMPLE 10

Following the procedure of Example 2, 30 grams of the titanyl sulfate was added to 300 cc. of 1.300 sp. gr. H₂SO₄, heated to 105° C., cooled, reconstituted for lost water, permitted to settle and decanted. The decanted solution had a specific gravity of 1.3167.

EXAMPLE 11

For this test, a series of solutions were prepared by mixing quantities of buffered acid solution as prepared in Example 2 with additional 1.200 sp. gr. $H_2SO_4$ in various volume proportions, 30 cc. of each of the resultant solutions was tested on a pure titanium sample following the procedure in Example 2. The foregoing was repeated using the buffered acid solution of Example 5 and 1.300 sp. gr. $H_2SO_4$. The results of these tests are tabulated below with the data relating to the 1.214 sp. gr. buffered solution set forth in Section A of Table II and the data relating to the 1.310 sp. gr. buffered solution set forth in Section B of Table II.

TABLE II

|  | Parts Acid | Parts Buffered Solution | Weight Loss of Sample |
|---|---|---|---|
| Section A | 3 | 1 | 0.37% |
|  | 5 | 1 | 0.42% |
|  | 7 | 1 | 0.51% |
|  | 10 | 1 | 0.59% |
| Section B | 3 | 1 | 0.70% |
|  | 5 | 1 | 0.84% |
|  | 7 | 1 | 1.12% |
|  | 10 | 1 | 100%* |

* Test sample completely consumed.

EXAMPLE 12

An electrolyte was prepared by adding 10% by weight of submicron silica (Cab-O-Sil) to a buffered acid solution prepared as described in Example 5. The mixture was stirred to form a stable and smooth spreading gel.

EXAMPLE 13

One part by volume of the buffered acid solution prepared as described in Example 5 was added to 5 parts of 1.300 sp. gr. sulfuric acid solution and to this mixture was added 10 percent by weight of submicron silica (Cab-O-Sil). Upon stirring there was formed a stable and smooth spreading gel.

From the foregoing examples, it should be evident that the addition of a small quantity of titanyl sulfate to an aqueous sulfuric acid solution of any initial acid concentration will substantially inhibit the dissolubility therein of pure titanium. For storage battery use, the concentration of acid in the electrolyte must be sufficient to provide enough acid in a given space within the battery to give the required electrical output. On the other hand, chemical reactions within the battery or cell place a practical upper limit on the concentration of acid in the electrolyte. In general, an aqueous sulfuric acid solution having a specific gravity of 1.300 has been considered the strongest that can be used in a battery without causing undue attack on the electrodes and spacer elements. For the purpose of the present invention, it is presently preferred that the aqueous sulfuric acid solution prior to the addition of the titanyl sulfate have a specific gravity ranging between 1.200 and 1.300 with the latter end of the range preferred over the former. It is also presently preferred to admix the titanyl sulfate with the aqueous acid solution in the proportion of 10 grams of titanyl sulfate to 300 ml. of sulfuric acid solution following the procedure set forth in the above examples. This ensures the development of a saturated or substantially saturated titanium ion content. The titanyl sulfate buffered acid solution may be used as an electrolyte either in the liquid or gelled form as described above. It should be understood that any of the liquid concentrations may be gelled by the addition of an appropriate quantity of submicron particles of silica.

The gelled electrolyte produced in accordance with either of Examples 12 or 13 is virtually self-supporting while allowing ample ionic migration. However, acid fluid flow is inhibited and a high titanium ion gradient is produced therein which prevents continuous dissolution of the titanium in the electrolyte.

Figure 3:
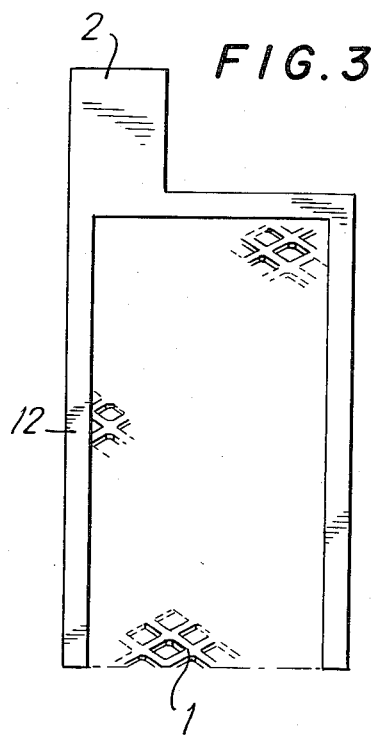
FIG. 3 is a view of the positive electrode titanium grid.

Referring now to the drawings, the positive electrode of the cell may comprise a grid of 10 mil thick commercially pure titanium sheet which has been expanded into diamond shaped perforations which increase the thickness of the grid to 0.045 inch. On heavy current drains, I have found there is an internal resistance drop along the long axis of the grid (plate). To reduce this to a minimum, strips of unexpanded titanium are welded along the sides and top of the grid as shown in FIG. 3. The expanded metal construction with spot-welded connecting strips materially reduces the overall weight of parts. The high tensile strength and spring character of the walls of the diamond shaped spaces in the expanded plate or grid provide uniform electrical conductivity to the positive reactants, lead peroxide or its discharge product, lead sulfate.

The titanium grid requires a superficial nonpolarizing film thereover, such as gold, to prevent anodic polarization at the interface of the grid structure and the lead peroxide. The gold film is, in turn, lead plated prior to receiving the lead peroxide coating in order to provide minimum contact resistance effects to the oxide.

The high mechanical strength of the pure titanium metal allows thin plates of expanded grids to be made which gives a greater depth of reversible reaction in the reactant and reduces tendency for anodic ionic gradients to be developed at excessive current density since the many diamond shaped spaces distribute the current more uniformly over a wider area.

For a practical, low cost, light weight negative electrode, I presently prefer to utilize a thin expanded copper sheet or copper gauze, having a plated lead coating, with its external connecting tab an integral part of the plate. If desired, however, titanium may be substituted for the copper.

The spacer in the embodiment illustrated in the accompanying drawings comprises, in part, the acid medium by being in the form of a non-separating, self-supporting gel produced as described in Examples 12 and 13 above. The gel is confined to a specific area by a polyethylene frame. By way of example, this frame has an one-eighth inch wide border and one-eighth inch center strip, thus containing the gel in contact with the electrodes and preventing squeezing out or loss of electrolyte when the assembly is compressed and encapsulated. In order to mechanically hold the lead peroxide in place and limit shredding effects during the large density changes which occur on charge and discharge, a thin sheet of unwoven porous electrolyte permeable styrene bonded glass fibre 20 mils thick is placed in contact with the positive electrode. The thickness of the plates and amount of reactants are determined by the quantity of acid available for the reversible reactions. The gelled acid, confined by the polyethylene frame spacer, provides a relatively immobile electrolyte which reduces local chemical actions by eliminating free circulation of the electrolyte with dissolved by-products.

The cells are constructed by filling the expanded spaces of both positive and negative electrodes with a paste essentially composed of National Lead Co. No. 1173 red lead ($Pb_3O_4$), or equivalent. The paste is made by mixing 20 grams of $Pb_3O_4$ with 3 ml of a 2 percent solution of $Ba(OH)_2$. It is dried, then ground with 3 ml of a 6 percent solution of $H_3PO_4$ and 1 ml of 1.400 sp. gr. $H_2SO_4$ to a spreadable paste. The $Ba(OH)_2$ intergranularly precipitates to an insoluble $BaSO_4$ which increases the porosity of the reactant and subsequent effective area. The electrodes are filled by placing the expanded plates on a polyethylene plastic sheet and spreading the paste thereon with a spatula to provide a flat surface. They are hung on a rack to dry for 20 hours and then dipped in 1.400 sp. gr. sulfuric acid which completes the conversion of the $Pb_3O_4$ to $PbO_2$ and $PbSO_4$. The $PbSO_4$ content plus some lead phosphate formed, assists as a bonding agent for the lead oxide and the filled grid is allowed to dry and harden for 48 hours. When the coating on the electrodes is hard and dry, they are placed in an electrolyte of 1.07 sp. gr. $H_2SO_4$ containing 1 percent of phosphoric acid and charged at a current density of the order of 20 ma. per square inch of electrode area for 72 hours until practically all of the positive electrode coating is composed of lead peroxide and the negative electrode of porous lead. The formed electrodes are then drained and dipped into a buffered titanyl sulfate-sulfuric acid electrolyte to displace the absorbed forming solution. They are again drained and dried on an absorbent paper towel. The positive plate is placed on a polyethylene board and the unwoven styrene bonded glass sheet is applied on the positive electrode and held in place by a thin layer of the gelled electrolyte. The polyethylene frame 62 mils thick is placed on the styrene bonded glass sheet and the space within the borders of the polyethylene frame is filled with the gelled electrolyte. The negative electrode is placed on top of the gel-filled polyethylene frame and the assembly is turned over with repetition of the same procedure followed on the opposite side. The entire assembly is then placed on a thin sheet of saran and wrapped with two turns and the bottom part of the saran wrapper which is equal in width to the length of the positive electrode is folded over the unit so that the bottom part of the unit is completely covered. Adhesive tape, such as Scotch brand cellulose tape, is applied to complete the sealing and binding of the saran wrapping so that when encapsulated, no expoxy resin will enter into the couple.

After the assembly has been covered and sealed by the tape and the saran wrapping, it is immersed in a rectangular styrene container which is half filled with a sulfuric acid resistant epoxy resin and hardener, e.g., Atlas Co. No. E-22, and further epoxy mixture is added to cover the entire unit about one-fourth inch above the top and allowed to stand so as to expel occluded air or gases formed in the formation process. It takes about 2 hours for this epoxy to harden. Should enough air or gas be evolved as to create a small vent hole, this hole is then filled with a quick acting epoxy such as one which hardens in 5 minutes. When the epoxy is hardened, further amounts are added, such as three-eighths inch more, which then fills the top of the container. The two lead plated copper leads or tabs of the negative electrodes are soldered or otherwise joined together. The integral expanded titanium tab of the positive plate or grid is provided with a thin (0.005") strip of nickel spot-welded thereto and solder-coated so that a copper connecting lead can be soldered to it. Alternatively, a lead strip can be joined to the titanium tab by cold pressing.

When commercially pure titanium is used as an electrode support, the electrolyte is preferably prepared as described in Example 12. The gelling of the electrolyte is particularly important in connection with those electrolytes which have the greater concentrations of titanyl sulfate, e.g., as prepared in Examples 2, 5, 7, 8, 9, 10 and 12. Without the gel, colloidal lead is produced in the electrolyte by reaction with the porous lead on the negative electrode. As mentioned above, immobilization of the electrolyte by gelling restricts or inhibits that reaction.

As an alternative to immobilizing the electrolyte by gelling, it is possible to reduce the production of colloidal lead by reducing the concentration of titanyl sulfate in the electrolyte. This may be accomplished by the addition of unbuffered acid solution as described in Example 13 or by adding less titanyl sulfate initially. It has been found that using the titanyl sulfate in a quantity of the order of 20 percent of that required for saturation will minimize the colloidal lead effects mentioned above. When a liquid electrolyte is used, it is preferred to encase the electrode in a microporous envelope. For minimum effect of the sulfuric acid on commerically pure titanium, however, the full strength titanyl sulfate electrolyte is preferred.

After the epoxy has hardened and there is no evidence of gas or liquid leakage, the encapsulated unit is placed in an oven at 140° F. for 24 hours to ensure that complete sealing has taken place. A quick acting epoxy, as mentioned previously, is applied if further sealing is required.

Figure 2:
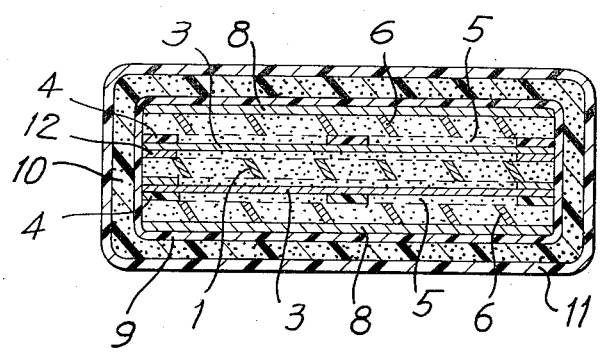
FIG. 2 is a transverse sectional view taken along the line 2—2 in FIG. 1.

Referring in greater detail to FIGS. 1 and 2, there is shown a battery in which a plastic rectangular case (11) houses a cell assembly having a positive electrode (1) comprising an oxide impregnated expanded titanium metal grid having nickel or lead terminal (2) to which is soldered lead (2a). The expanded titanium metal grid has a spot welded connecting titanium strip along the sides and top, as illustrated in FIG. 3 to reduce the internal resistance drop along the long axis of the grid. Prior to impregnation, a film of vapor deposited gold and superposed lead plating (not shown) are applied to the grid to prevent anodic polarization of the interface of the titanium and the lead peroxide. Thin sheets (3) of unwoven styrene bonded glass fibre are in contact with the positive electrode and polystyrene frame (4), illustrated in FIG. 4. The electrolyte (5) is a non-separating, self-supporting thixotropic gel made such as described in Example 12. It is confined within the open areas of the frame (4), the walls of which prevent squeezing out or loss of electrolyte when the assembly is compressed and encapsulated. The negative electrode is a corrugated sheet (5) of thin lead plated expanded copper, having integral external tabs (7) to which wire leads (7a) are soldered. Sheets of 60 mil thick resin treated paper (8) are placed against the outer sides of electrode (6). These serve as compressible and absorbent end plates if the cell is subjected to excessive over-charging and to protect the cell from the effects of heat produced in the exothermic reaction accompanying the setting of the encapsulating epoxy resin. The assembly is then tightly wrapped and enclosed in polyvinylidene chloride (saran) (9) so as to avoid impregnation of the encapsulating resin into the unit, the saran wrapping being taped to close open areas and complete the sealing of the cell. The wrapped sealed unit is then placed in plastic container (11) which is half filled with warmed epoxy resin (10). The resin is allowed to slowly cover the unit, allowing time for occluded air or gas to escape and the resin to harden, the cell being now hermetically sealed and having the two flexible copper leads (2a) and (7a) extending through the top. The encapsulation of the wrapped unit in the epoxy resin hermetically seals the cell and maintains the gelled electrolyte in pressure contact with the electrodes and prevents evaporation and consequent dehydration of the electrolyte. Suitable inert encapsulants, other than the epoxy, may also be used.

Figure 4:
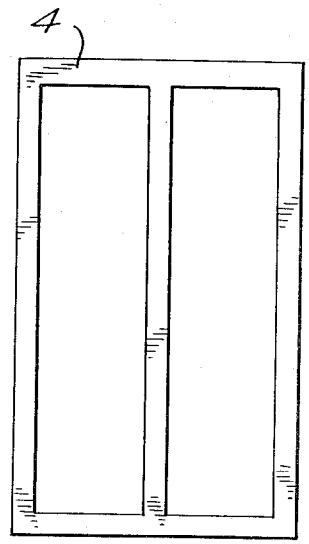
FIG. 4 is a view of the frame spacer employed in the battery of FIG. 1.

FIG. 3 is a view of the positive electrode titanium grid, showing the unexpanded titanium metal strip (12) joined to the nickel or lead tab (2) secured to the expanded titanium plate. Other suitable metals may be substituted for the titanium metal strip. FIG. 4 is a view of the polyethylene frame (4) showing the spaces in which the gelled electrolyte is contained.

In connection with the various examples set out herein an attempt was made to determine the specific gravities of the buffered acid solution with particular accuracy. For this purpose a Pycnometer having a volume of 50 cc. at 20° C. was employed. However, the measurements were not conducted under controlled temperature conditions and for that reason and other reasons known to the art the various measurements may include some errors. Therefore, the results set out herein are for general guidance only and cannot be relied upon other than in connection with the specific process for producing the electrolyte as described herein.

From the data contained herein it should be apparent that in general the acid solution after adding the titanyl sulfate is heated to a temperature not exceeding 105° C. Heating above this temperature does not appear to be beneficial and may, in fact, be detrimental. In any case, however, heating the solutions above the boiling point should be avoided.

It is to be understood that wherever the expression "pure titanium" appears throughout the disclosure and claims what is contemplated is the material known as "commercially pure titanium."

Having described my invention in terms of the presently preferred embodiments thereof, it will be understood that various changes may be made therein as will occur to those skilled in the subject art without departing from the true spirit thereof as defined in the appended claims.

What is claimed is:

1. An electric storage battery comprising a positive electrode of lead peroxide supported on a titanium grid, a negative electrode of porous lead supported on a conductive metallic grid, and a sulfuric acid electrolyte comprising a mixture of a major proportion by weight of aqueous sulfuric acid solution having a specific gravity within the range of 1.200 to 1.300 and a minor proportion by weight of titanyl sulfate with the latter being dissolved in said acid solution in sufficient quantity to inhibit dissolubility in said electrolyte of the titanium from said titanium grid.

2. An electric storage battery according to claim 1, wherein said titanyl sulfate is the compound having the formula $TiOSO_4 \cdot H_2SO_4 \cdot 8H_2O$.

3. An electric storage battery according to claim 1, wherein said electrolyte is in the form of a gel.

4. An electric storage battery according to claim 1, wherein said electrolyte is gelled by the admixture of submicron particles of silica.

5. An electric storage battery according to claim 1, wherein said electrolyte is the product resulting from admixing titanyl sulfate with aqueous sulfuric acid solution in the proportion of 1 to 10 grams of titanyl sulfate to each 300 ml of acid solution, and heating the admixture to below its boiling point.

6. An electric storage battery according to claim 5, wherein said admixture is heated to a temperature no greater than 105° C.

7. An hermetically sealed lead/sulfuric acid/lead peroxide cell having a positive electrode comprising a titanium base and a coating of lead peroxide, a non-polarizing conductive film interposed between the titanium and the lead peroxide, an immobilized gelled electrolyte comprising aqueous sulfuric acid having a specific gravity within the range of 1.200 to 1.300, and a gelling agent, said electrolyte further having a titanium ion content, and a negative electrode of lead.

8. The cell described in claim 7, characterized in that the electrolyte has a saturated titanium ion content.

9. The cell described in claim 7, characterized in that the electrolyte contains titanyl sulfate.

10. The cell described in claim 7, characterized in that the lead peroxide coating contains a minor amount of lead phosphate.

11. The cell described in claim 7, characterized in that the lead peroxide coating contains a minor amount of barium sulfate.

12. The cell described in claim 7, characterized in that the non-polarizing conductive film is composed of at least one of the metals gold and lead.

13. In a lead/sulfuric acid/lead peroxide cell, the combination with a titanium base having a coating of lead oxide and a non-polarizing film therebetween, of an immobilized gelled electrolyte comprising aqueous sulfuric acid having a specific gravity within the range of 1.200 to 1.300, and a gelling agent, said electrolyte further having a saturated titanium ion content, said electrolyte being held in a confined area and in direct contact with said lead oxide coating.

14. An hermetically sealed lead/sulfuric acid/lead peroxide cell having a positive electrode comprising a titanium grid having a coating of lead oxide, an immobilized gelled electrolyte comprising aqueous sulfuric acid having a specific gravity within the range of 1.200 to 1.300, and a gelling agent, said electrolyte further having a saturated titanium ion content, a negative electrode of lead, a spacer having a frame structure located between the electrodes, the open areas of said frame holding and confining said electrolyte in contact with said electrodes.

15. The cell described in claim 14, characterized in that the gelling agent is finely divided silica.

16. The cell described in claim 14, characterized in that means are provided to hold said confined electrolyte in continuous pressure contact with said positive electrode.

17. The cell described in claim 14, characterized in that a thin electrolyte permeable spacer is interposed between said frame and said positive electrode.

18. The cell described in claim 14, characterized in that an absorbent protective sheet is positioned against the outer side of the negative electrode.

19. An electric storage battery according to claim 1, wherein said electrolyte has a saturated titanium ion content.

* * * * *